(12) United States Patent
Nakamura

(10) Patent No.: US 7,210,863 B2
(45) Date of Patent: May 1, 2007

(54) CAMERA CONTROL SYSTEM, CAMERA SERVER, CLIENT, CONTROL METHOD, AND RECORDING MEDIUM

(75) Inventor: Minoru Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 151 days.

(21) Appl. No.: 10/504,405

(22) PCT Filed: Dec. 11, 2003

(86) PCT No.: PCT/JP03/15896

§ 371 (c)(1),
(2), (4) Date: Aug. 11, 2004

(87) PCT Pub. No.: WO2004/056117

PCT Pub. Date: Jul. 1, 2004

(65) Prior Publication Data
US 2005/0078180 A1    Apr. 14, 2005

(30) Foreign Application Priority Data
Dec. 13, 2002    (JP) ............................. 2002-362686

(51) Int. Cl.
*G03B 17/00* (2006.01)
*G03B 29/00* (2006.01)
*H04N 7/18* (2006.01)

(52) U.S. Cl. ....................... 396/427; 396/429; 348/143

(58) Field of Classification Search ........ 396/427–429; 348/14.05, 143
See application file for complete search history.

(56) References Cited

U.S. PATENT DOCUMENTS 6,067,624 A * 5/2000 Kuno ......................... 726/17
6,133,941 A * 10/2000 Ono ....................... 348/14.05
6,239,836 B1 * 5/2001 Suzuki et al. ............ 348/211.3

FOREIGN PATENT DOCUMENTS

| JP | 10/136347 | 5/1998 |
| JP | 10-304239 | 11/1998 |
| JP | 2000-50243 | 2/2000 |
| JP | 2001-218194 | 8/2001 |

* cited by examiner

*Primary Examiner*—W. B. Perkey
(74) *Attorney, Agent, or Firm*—Frommer Lawrence & Haug LLP; William S. Frommer; Thomas F. Presson

(57) ABSTRACT

A camera control system in which operations intended by clients can be carried out by a camera server by appropriately managing and controlling every client that wishes to control a camera so that operation commands are issued to the camera server from only one client at any given time. The camera control system includes a camera server that controls a camera whose angle can be freely controlled and a plurality of clients that control the camera and display images transmitted from the camera server on a display screen. The camera server includes notifying means that have been issued by one client to notify the client of time information including a waiting time before the camera control is possible and a permitted control time during which the camera control is permitted for a fixed period after the waiting time has elapsed.

40 Claims, 7 Drawing Sheets

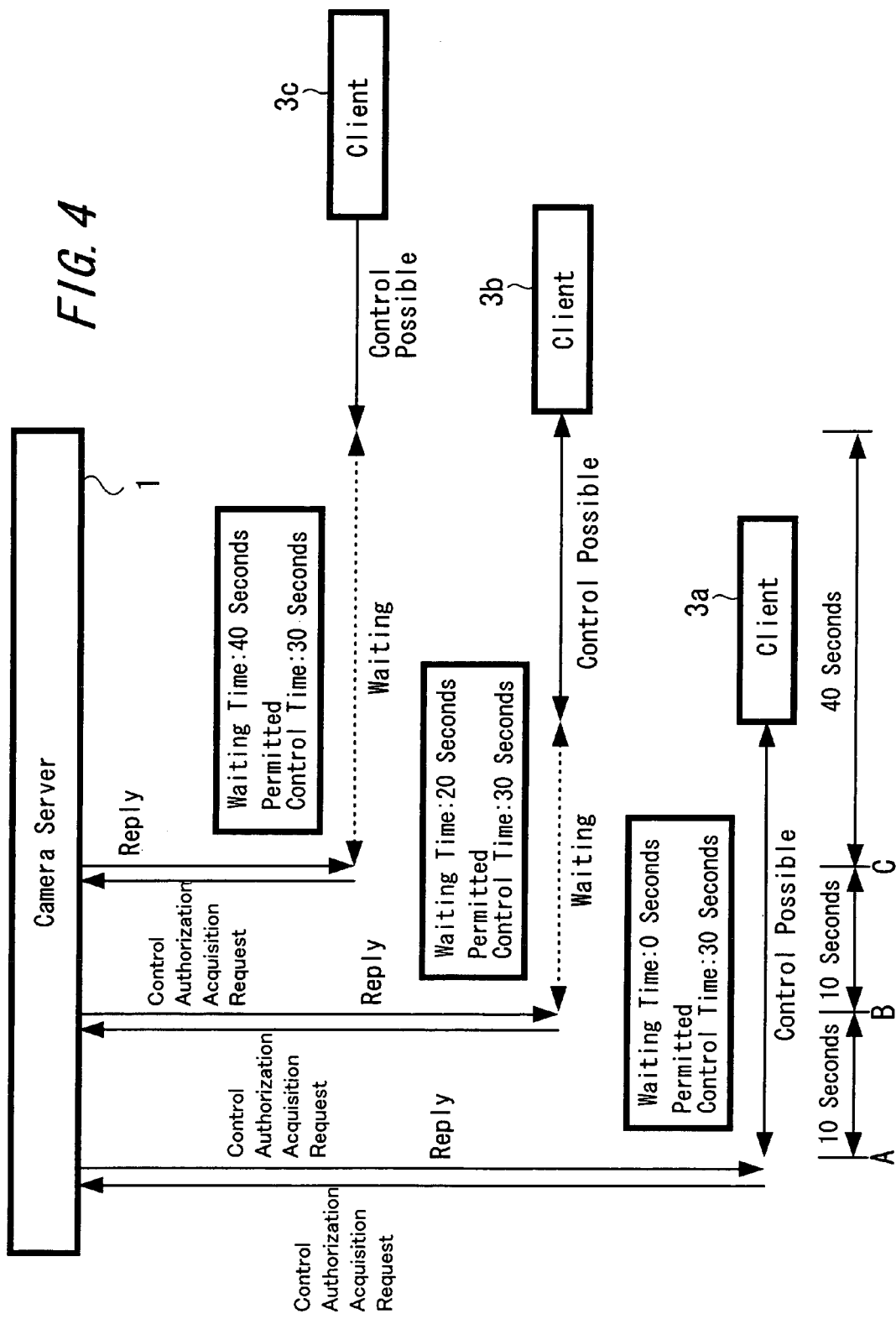

FIG. 5A

| ID | Waiting Time | Control Time |
|---|---|---|
| A | 0 | 20 |
| B | 20 | 30 |
| — | — | — |

↑ 10 Seconds Later

FIG. 5B

| ID | Waiting Time | Control Time |
|---|---|---|
| A | 0 | 10 |
| B | 10 | 30 |
| C | 40 | 30 |

↑ 10 Seconds Later

FIG. 5C

| ID | Waiting Time | Control Time |
|---|---|---|
| Deleted | 0 | 0 |
| B | 0 | 30 |
| C | 30 | 30 |

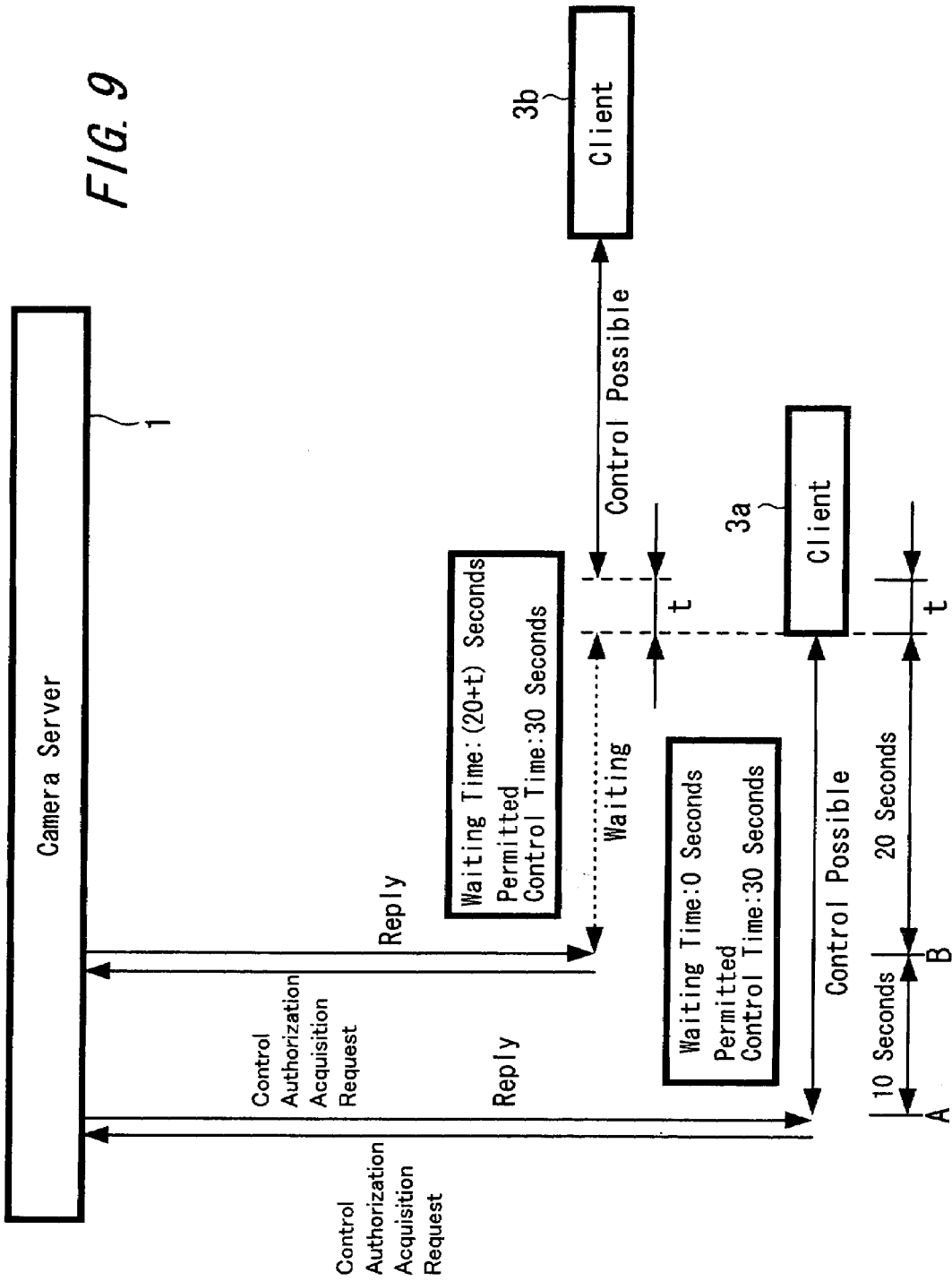

CAMERA CONTROL SYSTEM, CAMERA SERVER, CLIENT, CONTROL METHOD, AND RECORDING MEDIUM

TECHNICAL FIELD

The present invention relates to a camera control system that appropriately manages a plurality of clients connected to a camera server for controlling a single camera with functions such as pan, tilt, and zoom, and also to a camera server, a client, a control method, and a recording medium.

BACKGROUND ART

Conventionally, systems such as monitoring camera apparatuses are available for controlling photographic apparatuses, such as video cameras, from a remote location. When such apparatuses are used for crime prevention and the like, normally there are only a few users who wish to control the same camera. Accordingly, there have not been occasions when a plurality of controllers simultaneously control a single camera.

DISCLOSURE OF THE INVENTION

However, with the increasing use of networks such as the Internet in recent years, there are now so-called "network cameras" that are video cameras and still cameras (hereinafter simply referred to as "cameras") where it is possible for images photographed by a video camera or the like connected to a network to be received and viewed by a plurality of viewers.

Instead of just having viewers watch images distributed from a video camera, network camera systems where a video camera that can be computer controlled is connected to a WWW (World Wide Web) server (hereinafter also referred to as a "camera server") on a network and remotely located clients are allowed to control functions of the camera, such as pan, tilt, and zoom, via the network are also being developed.

However, for a camera with functions such as pan, tilt, and zoom, when a plurality of clients simultaneously try to transmit such operation commands to the camera server, the camera server will try to process all of the operation commands, so that conflicts are likely between the camera control requests from the clients. For this reason, since it is not possible to carry out the operations intended by the respective clients, there is demand for a mechanism for appropriately managing the camera control requests from a plurality of clients.

In view of the above problem, the present invention provides a camera control system, a camera server, a client, a control method, and a recording medium that can have the operations intended by clients executed by a camera server by carrying out appropriate management and control of all of the clients who wish to control the camera so that at any given time, operation commands are issued to the camera server from only one client.

A camera control system according to the present invention includes: a camera server that controls a camera whose angle can be freely controlled; and a plurality of clients that control the camera and display images transmitted from the camera server on a display screen, wherein the camera server includes notifying means operable, when the camera server has received a control authorization acquisition request for camera control that has been issued by one client, to notify the one client of time information including a waiting time before the camera control is possible and a permitted control time during which the camera control is permitted for a fixed period after the waiting time has elapsed.

A control method for a camera server according to the present invention is a control method for a camera server that includes a camera whose angle can be freely controlled and that transmits images photographed with the camera in accordance with instructions from clients in remote locations to the clients, the control method including a step of notifying, when the camera server has received a control authorization acquisition request for camera control that has been issued by a client, the client of time information including a waiting time before camera control is possible and a permitted control time during which camera control is permitted for a fixed period after the waiting time has elapsed.

A control method for a client according to the present invention is a control method for a client that is connected to a camera server that transmits images photographed by a camera whose angle can be freely controlled, the control method including: a step of issuing the control authorization acquisition request for camera control and identification information for the client to the camera server; a step of receiving a waiting time before camera control is possible and a permitted control time during which camera control is permitted for a fixed period after the waiting time has elapsed that are sent in reply from the camera server that has received the control authorization acquisition request and the identification information; and a step of informing, after the waiting time has elapsed from a point at which the waiting time was received, a user that camera control is permitted.

According to the present invention, when a control authorization acquisition request is issued from a client to the camera server, the camera server notifies the client of the waiting time and the permitted control time, so that it is possible to manage the camera control authorization of a client by merely carrying out communication a minimum of once.

BRIEF DESCRIPTION OF DRAWINGS

FIG. 4 is a diagram showing one example of the flow of transactions between the camera server and clients according to the present invention;

FIGS. 5A to 5C are diagrams showing one example of a transition with the elapsing of time of the management table of the camera server according to the present invention;

FIG. 9 is a diagram showing another example of the flow of transactions between the camera server and clients according to the present invention.

BEST MODE FOR CARRYING OUT THE INVENTION

A preferred embodiment of the present invention is described below with reference to the attached drawings.

Figure 1:
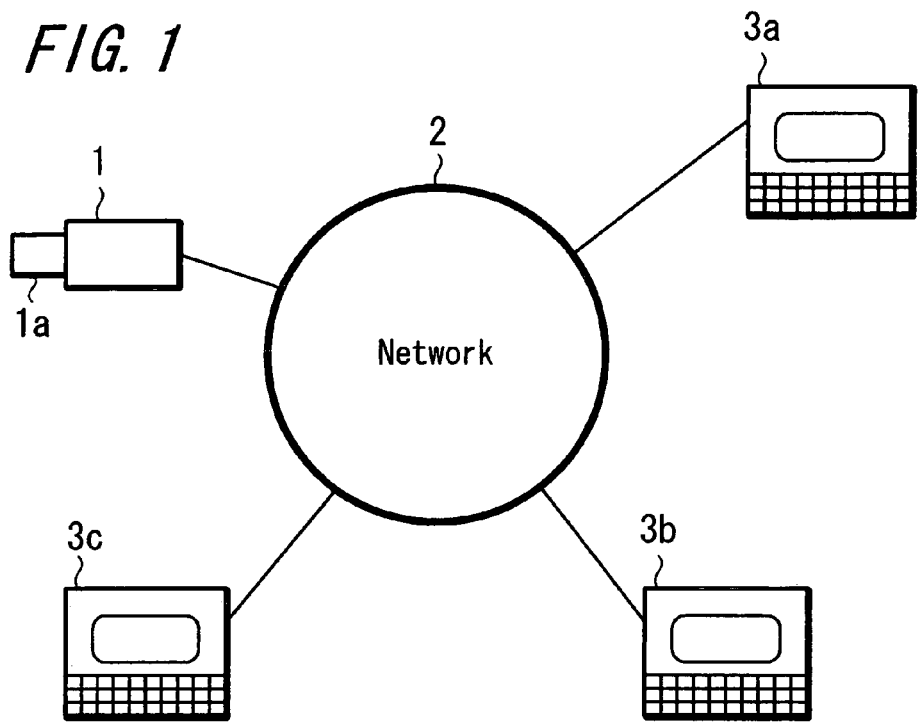
FIG. 1 is a diagram showing one example of a camera control system.

FIG. 1 is a diagram showing one example of a typical camera control system. Reference numeral 1 designates a camera server that controls a photographic apparatus (hereinafter referred to as the "camera") such as a video camera or a still camera, reference numeral 2 designates a network (electrical communication lines) such as the Internet, and reference numerals 3a, 3b, and 3c designate clients that receive a service provided by the camera server 1. In this camera control system, images from one camera server 1 connected to the Internet, a LAN (Local Area Network), or the like are viewed by a plurality of clients connected to the same network. This camera control system is used as a monitoring system or as a promotional attraction for applications such as online shopping or introducing a tourist spot. The camera 1a transmits JPEG or MPEG compressed image data or the like in real time to the respective clients.

The camera server 1 is a server that can be accessed via the WWW on the Internet 2, is connected to the camera 1a, and in accordance with operations received from the clients, controls the camera 1a, and distributes the image data and the like photographed by the camera 1a to the respective clients that are accessing the camera server 1. The camera 1a referred to here has various functions such as pan, tilt, and zoom, and as one example is a camera that is assigned an IP address and is connected via the camera server 1 to the Internet.

Although not shown, the camera server 1 includes a CPU that carries out various control operations in the camera server 1, a non-volatile memory such as a ROM or an EEPROM that stores various control programs to be executed by the CPU, a RAM that provides a work area required by the CPU to carry out the various control operations, a network interface, such as a modem, that connects to the network, an image interface that receives images from the camera 1a and an interface for driving the camera, and is a conventional server in which data communication can be carried out between the respective components via a PCI bus or the like.

The respective clients 3a, 3b, and 3c are personal computers (hereinafter "PCs") and also include display apparatuses such as LCDs (Liquid Crystal Displays), storage media such as ROMs, and WWW browsers and the like, and can be any device that functions as a terminal capable of accessing the network 2. The respective clients 3a, 3b, and 3c also include input apparatuses such as keyboards or pointing devices.

The network 2 is electrical communication lines which, aside from the Internet, can be composed of a wired LAN such as an ETHERNET (registered trademark), or a wireless LAN standardized according to IEEE (Institute of Electrical and Electronics Engineers) 802.11 or the like.

The camera server 1 and the respective clients 3a, 3b, and 3c are connected via the network 2 and in addition to making it possible to carry out desired operations of the camera 1a connected to the camera server 1 in accordance with operation requests from the clients, the camera server 1 transmits image data photographed by the camera 1a to the clients that are accessing the camera server 1.

Figure 2:
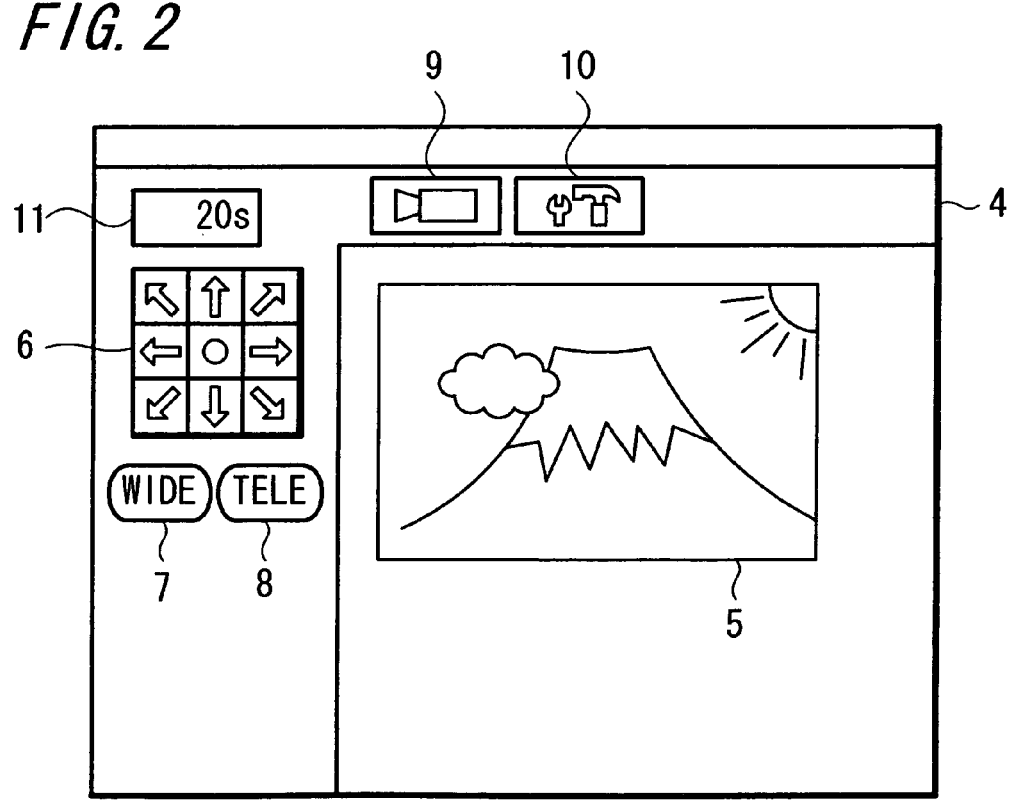
FIG. 2 is a diagram showing one example of a display screen of a client.

FIG. 2 shows an example of a display screen of a client. Reference numeral 4 designates a display screen composed of an LCD or the like, and reference numeral 5 designates an image display part in which images and video photographed by the camera 1a are received via the network 2 and are viewed using a WWW browser. Reference numeral 6 designates a pan/tilt operation part where an arrow button pointing in a desired direction for movement of the camera 1a with respect to the image presently on display in the image display part 5 is clicked to change the camera position via a pan or tilt operation, and reference numerals 7 and 8 respectively designate zoom operation parts. Reference numeral 11 designates a time display part that displays a waiting time until camera control permission, described later, is received, or one of a permitted control time and a remaining control time. Here, two time display parts may be disposed to respectively display such times.

Reference numeral 9 designates a camera operation part display button (icon) and when this button is selected by any kind of pointing device such as a mouse, a control authorization acquisition request is issued to the camera server 1 and an entire camera operation part composed of the pan/tilt operation part 6, the zoom operation parts 7 and 8, and the like described above is displayed. Reference numeral 10 designates an administrator setting menu display button (icon) that is used by an administrator, described later, to make desired settings.

In the camera control system according to the present embodiment, first a control authorization acquisition request command is issued to the camera server 1 from a client where a user has selected the camera operation part display button 9 to indicate a desire to operate the camera. In reply to the received control authorization acquisition request, the camera server 1 sends a waiting time and permitted control time to the client in question.

The expressions used in this specification have the meanings given below.

The "waiting time" is the total amount of time for which control permission has already been granted to other clients.

The "permitted control time" is the amount of time control can be carried out per client, and is set in advance in the camera server 1.

The "control time" is the remaining time for which control is possible, and has the permitted control time as a maximum.

Figure 3:
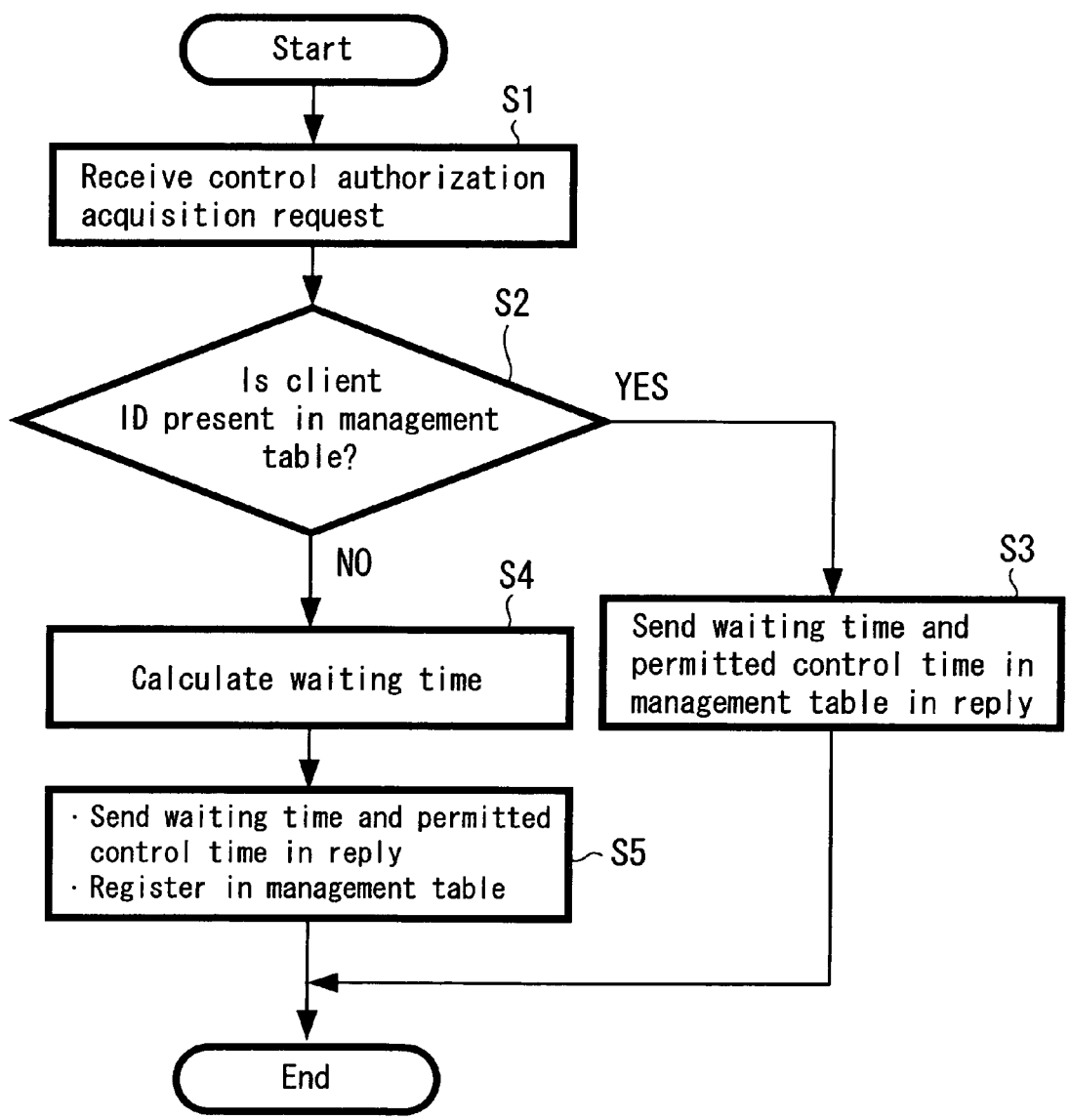
FIG. 3 is a flowchart showing the processing of a control authorization acquisition request command by the camera server according to the present invention.

As shown in FIG. 3, the client that desires camera operation first issues a control authorization acquisition request to the camera server 1 and the camera server 1 receives the control authorization acquisition request (step S1). The camera server 1 that received the control authorization acquisition request carries out a search to confirm whether a client ID (identification information) sent together with the control authorization acquisition request is present in a management table recorded and managed in the ROM, non-volatile memory or the like (described later) of the camera server 1 (step S2).

When the client ID in question is present in the management table, that is, when the control authorization acquisition request has been received from the same client as before, the camera server 1 replies by notifying the client of the waiting time and permitted control time given in the management table (step S3).

When the client ID is not present in the management table, the camera server 1 calculates the waiting time (step S4) and replies by notifying the client terminal of the calculated waiting time and the aforementioned permitted control time set in advance. In addition, the present client ID and the associated waiting time and permitted control time are registered in the management table.

Here, when the permitted control time per client is set at 30 seconds, for example and the clients 3a, 3b, and 3c issue control authorization acquisition requests in that order at 10 second intervals, for example, the flow of the transactions between the camera server 1 and the clients is shown in FIG. 4.

First, the camera server 1 replies to the client 3a that issued the control authorization acquisition request first by notifying the client 3a of a waiting time of zero seconds and the permitted control time of 30 seconds. To the second and following clients, the camera server 1 replies with a time given by adding the waiting time and the remaining control time for the most recent client to issue a control authorization acquisition request as the waiting time and simultaneously with the permitted control time per client, which is set in advance, as the permitted control time. In this example, the client 3b is 10 seconds behind the client 3a, so that a waiting time of 20 seconds and a permitted control time of 30 seconds are sent in reply. Also, the client 3c is 10 seconds behind the client 3b, so that a waiting time of 40 seconds and a permitted control time of 30 seconds are sent in reply.

Figure 6:
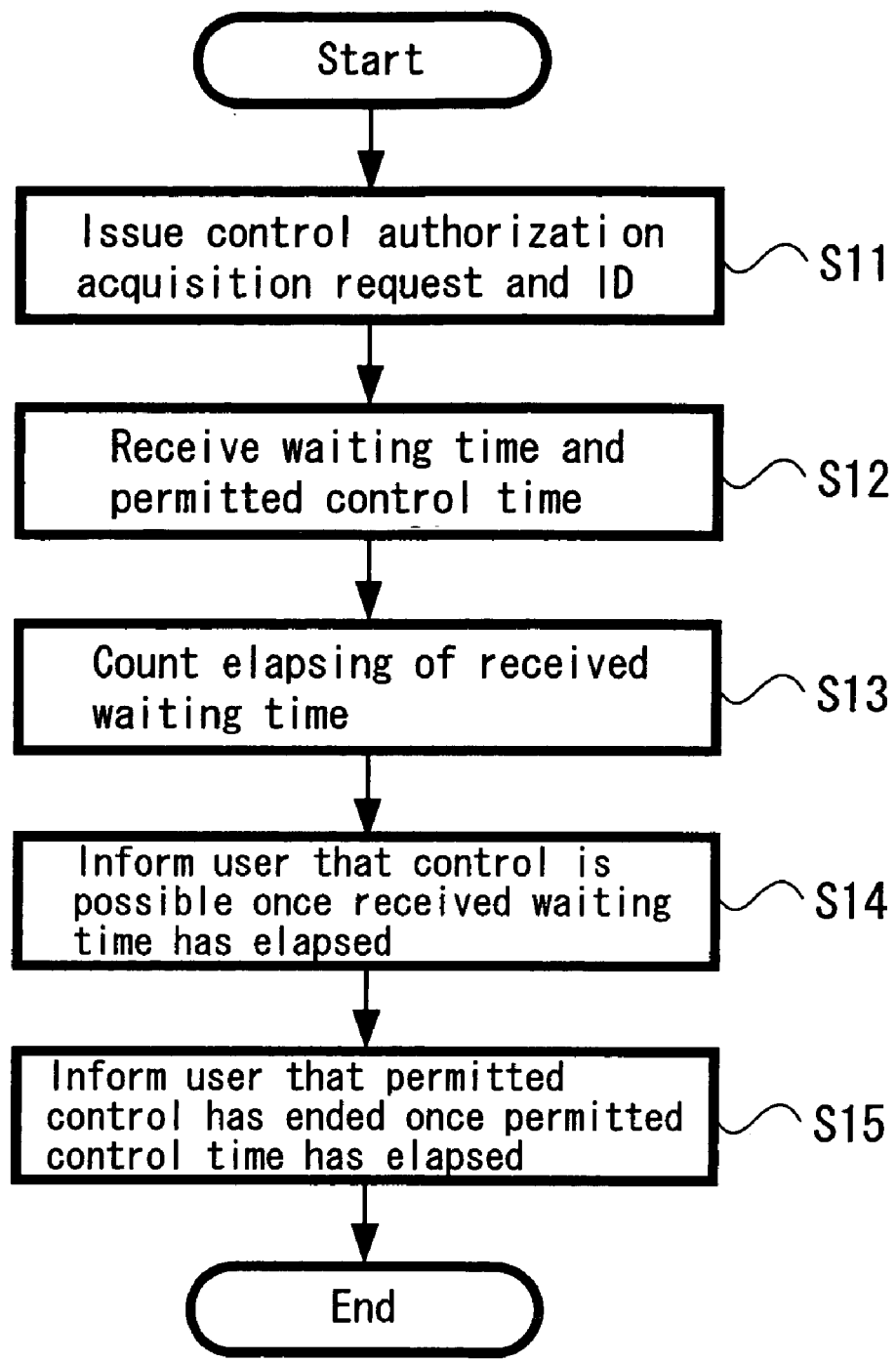
FIG. 6 is a flowchart showing the processing by a client according to the present invention.

FIG. 6 is a flowchart showing the processing by a client. As described above, when a client has issued the control authorization acquisition request and the client ID (step S11), the waiting time and permitted control time are received from the camera server 1 (step S12). The client counts the number of seconds that have elapsed since the reply was received from the camera server 1 (step S13), and when the waiting time has elapsed, notifies the client user that control is permitted (step S14) and prompts the user to input an operation command. Also, when the counting of the control time is completed, the user is notified of the end of permitted control (step S15) and the inputting of operation commands by the user ends.

During the waiting time, the client may display the remaining seconds and the like on the display screen 4 to instruct the user to wait before inputting. When the wait time has elapsed and the control time is reached, by displaying the operation parts for inputting, the client informs the user that operation commands can be inputted. For example, a message such as "You can operate the camera" may be displayed on the display screen 4. When the user is away from the client, it is effective to give the user an audible indication.

At this time, while the remaining control time is being counted down, such remaining control time may be simultaneously displayed on the display screen 4. When the counting of the permitted control time reaches zero, the display of operation parts such as the pan/tilt operation part 6 is ended to inform the user that input is no longer possible. A message such as "The operation time has ended" may also be displayed on the display screen 4.

As described above, the camera server 1 replies to a control authorization acquisition request from any of the clients by merely sending the "waiting time" and "permitted control time", with the respective clients thereafter operating based on this time information so as to transmit camera operation commands to the camera server 1 during the appropriate period, so that operation commands will be transmitted to the camera server 1 from only one client at any given time and it is possible to manage the camera control authorization of a plurality of clients connected to the single camera server 1.

When issuing a control authorization acquisition request, a client simultaneously transmits the client ID recorded on a recording medium of the client terminal to the camera server 1. For example, an IP address used to identify a host terminal on the Internet and a local IP address used within a LAN may be used as the client ID, with an ID generated using a random number of 10 digits or so, for example, also being capable of sufficiently identifying a client. It is also possible to use a combination of such information. As another method, it is possible for the camera server 1 to assign a client ID composed of any random number to a client that has issued a control authorization acquisition request to the camera server 1 for the first time (a client in the state where an ID has not been registered in the management table described using FIG. 3).

Figure 7:
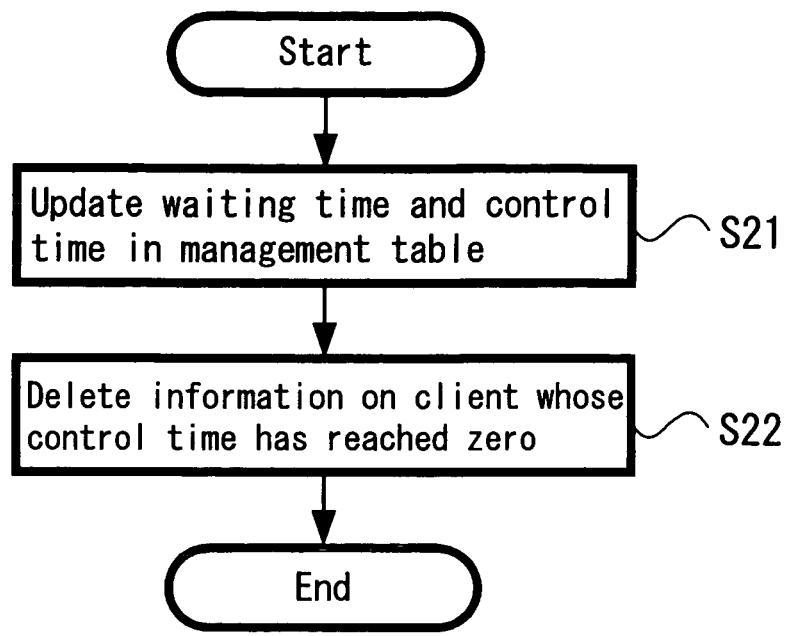
FIG. 7 is a flowchart showing the processing as time elapses for the management table of the camera server according to the present invention.

As mentioned in the above description, based on the client IDs, the camera server 1 generates a management table such as those shown in FIGS. 5A, 5B and 5C for managing information on the waiting times and control times in a recording medium such as a ROM. As shown by the example of the processing carried out as time passes in the management table in the flowchart in FIG. 7, at intervals of a fixed time, such as one second intervals, the waiting times and control times in the management table are updated (step S21). By doing so, at any given time, it is possible to manage elapsed time information on clients whose control time has not ended on the camera server 1 side. Also, as time passes, information on clients whose control time has reached zero is deleted (step S22) to make it possible for many clients to operate the camera.

FIG. 5A shows the management table in the case where the camera server 1 has received a control authorization acquisition request from the client 3b following the client 3a. In this example, suppose that the respective client IDs are registered as "A" and "B". At this time, for the client 3a, the waiting time is zero seconds and since the camera has been controlled for ten seconds, the remaining control time is twenty seconds. For the client 3b, the waiting time is twenty seconds and the control time is the permitted control time of thirty seconds.

FIG. 5B shows the management table in the case where the camera server 1 has newly received a control authorization acquisition request from the client 3c ten seconds after the state shown in FIG. 5A. In this example, suppose that the client ID is registered as "C". Since ten seconds have been counted from the previous state in FIG. 5A, the control time of the client 3a and the waiting time of the client 3b have been respectively reduced and updated to ten seconds. For the client 3c, the waiting time is forty seconds and the control time is the permitted control time of thirty seconds.

FIG. 5C shows the management table at a time ten seconds after the state shown in FIG. 5B described above. Since ten seconds have been counted from the previous state in FIG. 5B, the control time of the client 3a and the waiting time of the client 3b have been respectively reduced and updated to zero seconds, and the waiting time of the client 3c has been reduced and updated to thirty seconds. Since the control time is now zero seconds and the camera operation has ended for the client 3a, information on the client 3a is deleted from the management table in the camera server 1 as shown by the diagonal shading in FIG. 5C.

The client IDs are assigned so that only one permitted control time is given to each client. That is, when a control authorization acquisition request command from a client is received by the camera server 1, the camera server 1 first searches to confirm whether a client ID that is the same as the client ID sent simultaneously with the control authorization acquisition request command is present in the management table. If the same client ID is present, the camera server 1 sends the waiting time and control time for the same client ID in the management table to the client in reply. If the same client ID is not present, the camera server 1 calculates the waiting time of the present client by adding the waiting time and control time of the most recently permitted client, sends the calculated waiting time and the permitted control time to the present client in reply, and newly adds the client ID and time information of the present client to the management table.

By replying to a client already assigned control time by sending the information on the client that is managed in the camera server 1, a single client will not be given a plurality of permitted control times. That is, until a control time given to a client has elapsed, the same client cannot obtain a new control time. By doing so, it is possible to distribute the camera control time from a single camera server fairly among a plurality of clients. For example, even if control authorization acquisition requests are sent by a WWW browser displayed in a plurality of windows by the client, the camera server 1 identifies these requests as being from the same client, and does not assign two or more control authorizations in reply to such requests.

Figure 8:
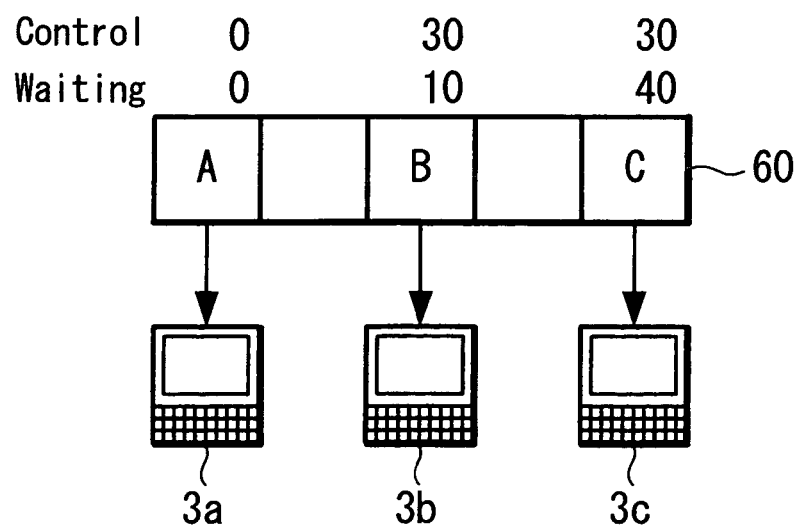
FIG. 8 is a diagram schematically showing the management table.

Next, an example of an information management method for the management table recorded on a recording medium will be described. A schematic diagram of a management table according to the present embodiment is shown in FIG. 8. Reference numeral 60 designates an information storage region in the non-volatile memory, for example. In the case where the number of clients that access the camera server 1 is set at fifty, for example, fifty information storage sections are present in this information storage region. FIG. 8 shows the information storage state for the management table shown in FIG. 5B, with information on the clients 3a, 3b, and 3c being respectively stored in three empty spaces in five of the information storage sections. The waiting times and control times are registered in the order in which the control authorization acquisition requests were issued and up to fifty clients are managed using these waiting times and control times.

In the case where a control authorization acquisition request has been issued from a new client, information relating to the new client is registered in either of the two empty information storage sections in FIG. 8. Alternatively, when information on the oldest client 3a has been deleted to free an information storage section, the information relating to the new client may be registered in the freed information storage section.

In this way, a waiting time and a control time are registered at the time at which a control authorization acquisition request is issued from a client without any particular attention being given to the storage positions of the information inside the information storage region 60. After this, such time information is counted at fixed intervals and the counted information is merely transmitted to the respective clients as necessary. Also, since as a minimum, it is sufficient for one control authorization acquisition request to be sent from a client, the load of the camera server 1 relating to management of the management table is reduced and the server resources of the camera server 1 can be provided to other functions, such as the transmission of images.

From the time information in the management table that manages the clients, the timing at which there is a switch in the client controlling the camera can be identified by the camera server 1. At this time, a control command that stops operations such as pan, tilt, and zoom is issued inside the camera 1a via the camera server 1 so that the operation of the camera 1a stops for a fixed time. By doing so, it is possible to avoid a situation where the camera is already operating when a new client attempts to control the camera, such as in cases where the switching of the client that operates the camera takes place during the execution of an operation command by the previous client. Since operations always start with the camera in a stopped state, it is possible to smoothly switch the client that operates the camera.

Also, depending on the network, there may be fluctuations in the time taken for the reception and transmission of commands between the camera server 1 and the respective clients 3a, 3b, and 3c and fluctuations in the time taken to measure the elapsed time by the clients. In such cases, when switching the client that can control the camera, there are cases where operation commands from the previous controlling client are delayed before reaching the camera server 1, so that there can be conflict between operation commands which results in the camera not carrying out the operation intended by the new controlling client.

To avoid the above situations, when switching the controlling client, a control-prohibited time of an appropriate length during which no client is assigned control time is provided.

For example, FIG. 9 shows another example of the flow of transactions between the camera server and the clients of the present embodiment. Compared to FIG. 4, in FIG. 9 the control-prohibited time is additionally provided, but the other parts are the same, with parts of FIG. 9 that correspond to FIG. 4 being indicated by the same reference numerals. In the case where a control authorization acquisition request is issued from the client 3b ten seconds after the client 3a issued a control authorization acquisition request first, the camera server 1 informs the client 3b of a waiting time (20+t) seconds that takes into consideration the control-prohibited time t. The permitted control time is the same as for the client 3a. When control by the client 3a ends, the client 3b can control the camera after waiting a further t seconds.

This control-prohibited time t absorbs the fluctuations and delays described above, and in addition to it being possible to have the camera 1a carry out the operations intended by the client 3b whose permitted control time has been reached, it is also possible to smoothly switch the controlling client.

Also, the permitted control time assigned to one client can be set in advance in the camera server 1, such as by selecting the administrator setting menu display button 10 in FIG. 2 to display a permitted control time setting screen or the like and then inputting a setting value. By doing so, it is possible for the administrator of the camera server 1 to set an appropriate permitted control time per access by a client in accordance with factors such as how the camera server 1 is used and demand.

In addition, the administrator of the camera server 1 may set in advance the maximum number of clients that can acquire control authorization. Since the camera server 1 holds information on clients for which the control time has not ended in the management table, at any time it is possible to know the number of clients assigned the permitted control time. If the number of clients has exceeded the set maximum number of clients, it is possible to reject new control authorization acquisition requests. By doing so, the maximum waiting time for a client that has acquired the control authorization can be kept below a given fixed time.

As shown in the present embodiment, if the waiting time is too long when the camera server requests a client to wait, users may end up not waiting and using the camera as intended. For example, if the waiting time is too long, the client user may undertake some other task and end up not using the camera, so that the chance to show the images photographed by the camera and promote products and the like will be lost. Accordingly, since it is possible to keep the maximum waiting time to less than a fixed time as described above, it is possible to distribute control authorization for the camera to many clients without waste so that images from the camera can be viewed by many client users.

As described above, according to the present embodiment, by having a minimum of one communication carried out between the camera server and each client, it is possible for the camera server to appropriately manage the control authorization of a plurality of clients, thereby achieving the effect of the camera server carrying out operations intended by clients without conflicts between the operation requests from different clients. There is also the effect that limited network bandwidth can be used effectively.

Also, according to the present embodiment, since a large part of the operations and processing required to have the camera server appropriately manage the control authorization of a plurality of clients is carried out by the clients themselves, the load of the camera server is reduced, resulting in the effect that server resources can be assigned to other functions, such as the transmission of images.

It is to be understood that the present invention may also be accomplished by supplying a system or an apparatus with a storage medium in which program code of software which realizes the functions of the above-described embodiment is stored, and causing a computer (or other control apparatus such as a CPU) of the system or apparatus to read out and execute the program code stored in the storage medium.

Examples of the storage medium for supplying the program code include a floppy disk, a hard disk, an optical disc, a magneto-optical disk, a CD-ROM, a CD-R, a magnetic tape, a nonvolatile memory card, and a ROM.

The present invention is not limited to the above-described embodiment, and it should be obvious that a variety of other constructions can be used without departing from the scope of the invention.

The invention claimed is:

1. A camera control system comprising:
a camera server that controls a camera whose angle can be freely controlled; and
a plurality of clients that control the camera and display images transmitted from the camera server on a display screen,
wherein the camera server includes notifying means operable, when the camera server has received a control authorization acquisition request for camera control that has been issued by one client, to notify the one client of time information including a waiting time before the camera control is possible and a permitted control time during which the camera control is permitted for a fixed period after the waiting time has elapsed.

2. A camera control system according to claim 1, wherein when the camera server has received a control authorization acquisition request from another client following the one client, a waiting time of the other client is calculated based on a remaining waiting time and the permitted control time of the one client or on a remaining part of the permitted control time if the one client has commenced the camera control after the waiting time has elapsed, and the other client is notified of the calculated waiting time and the permitted control time.

3. A camera control system according to claim 1, wherein the camera server includes:
searching means for receiving identification information that identifies a client that has issued the control authorization acquisition request, storing the identification information in a storage means provided in the camera server, and
searching a management table, for managing identification information and the waiting times and the permitted control times of clients corresponding to the identification information, to confirm whether the received identification information is included in the management table; and
registering means operable when the searching means finds that the received identification information is not included in the management table to associate the received identification information with the notified waiting time and the permitted control time and to register the identification information, the waiting time, and the permitted control time in the management table.

4. A camera control system according to claim 3, wherein when the searching means finds that the received identification information is included in the management table, the camera server does not accept a control authorization acquisition request from a client corresponding to the received identification information and notifies the client of the waiting time and the permitted control time of the client that are present in the management table.

5. A camera control system according to claim 3, wherein the camera server deletes the identification information and the time information corresponding to a client whose permitted control time in the management table has reached zero from the management table.

6. A camera control system according to claim 1, wherein when the client permitted to control the camera is switched, the camera server stops operations of the camera for a predetermined time.

7. A camera control system according to claim 1, wherein when the client permitted to control the camera is switched, the camera server does not accept a camera control request from the client permitted to control the camera for a predetermined time.

8. A camera control system according to claim 1, wherein, in the camera server, the permitted control time for which a client is permitted to control the camera can be freely set.

9. A camera control system according to claim 1, wherein, in the camera server, a maximum value can be set for a number of clients waiting to acquire control authorization.

10. A camera control system according to claim 1, wherein the plurality of clients respectively comprise:
issuing means for issuing the control authorization acquisition request and identification information;
receiving means for receiving the waiting time and permitted control time notified from the camera server; and
informing means operable after the waiting time has elapsed from a point at which the waiting time was received to for inform a user that the camera control is permitted.

11. A camera server that includes a camera whose angle can be freely controlled and transmits images photographed with the camera in accordance with instructions from clients in remote locations to the clients, the camera server comprising
notifying means operable, when the camera server has received a control authorization acquisition request for camera control that has been issued by one client, to notify the one client of time information including a waiting time before the camera control is possible and a permitted control time during which the camera control is permitted for a fixed period after the waiting time has elapsed.

12. A camera server according to claim 11, wherein when the camera server has received a control authorization acquisition request from another client following the one client, a waiting time of the other client is calculated based on a remaining waiting time and the permitted control time of the one client or on a remaining part of the permitted control time if the one client has commenced camera control after the waiting time has elapsed, and the other client is notified of the calculated waiting time and the permitted control time.

13. A camera server according to claim 11, wherein the camera server includes:

searching means for receiving identification information that identifies a client that has issued the control authorization acquisition request, storing the identification information in a storage means provided in the camera server, and searching a management table for managing identification information and the waiting times and permitted control times of clients corresponding to the identification information to confirm whether the received identification information is included in the management table; and registering means operable when the searching means finds that the received identification information is not included in the management table to associate the received identification information with the notified waiting time and the permitted control time and to register the identification information, the waiting time, and the permitted control time in the management table.

14. A camera server according to claim 13, wherein when the searching means finds that the received identification information is included in the management table, the camera server does not accept a control authorization acquisition request from a client corresponding to the received identification information and notifies the client of the waiting time and the permitted control time of the client that are present in the management table.

15. A camera server according to claim 13, wherein the camera server deletes the identification information and the time information corresponding to a client whose permitted control time in the management table has reached zero from the management table.

16. A camera server according to claim 11, wherein when the client permitted to control the camera is switched, the camera server stops operations of the camera for a predetermined time.

17. A camera server according to claim 11, wherein when the client permitted to control the camera is switched, the camera server does not accept a camera control request from the client permitted to control the camera for a predetermined time.

18. A camera server according to claim 11, wherein the permitted control time for which a client is permitted to control the camera can be freely set.

19. A camera control system according to claim 11, wherein a maximum value can be set for a number of clients waiting to acquire control authorization.

20. A client that is connected to a camera server that transmits images photographed by a camera whose angle can be freely controlled, the client comprising:

issuing means for issuing a control authorization acquisition request for camera control and identification information for the client to the camera server;

receiving means for receiving a waiting time before the camera control is possible and a permitted control time during which the camera control is permitted for a fixed period after the waiting time has elapsed that are sent in reply from the camera server that has received the control authorization acquisition request and the identification information; and informing means operable after the waiting time has elapsed from a point at which the waiting time was received to inform a user that the camera control is permitted for a fixed period after the waiting time has elapsed.

21. A client according to claim 20, wherein a remaining part of the received waiting time that changes as the received waiting time elapses is displayed on a display screen.

22. A client according to claim 20, wherein the user is informed that the camera control is possible by displaying a camera control operation section on a display screen to indicate that the waiting time has elapsed.

23. A client according to claim 20, further comprising a speaker, wherein the user is informed that the camera control is possible via a sound or voice emitted via the speaker to indicate that the waiting time has elapsed.

24. A client according to claim 20, wherein the user is informed that the time during which the camera control is possible has ended when the permitted control time has elapsed.

25. A client according to claim 20, wherein a remaining part of the permitted control time that changes as time passes is displayed on a display screen.

26. A client according to claim 20, wherein a user is informed that the time during which the camera control is possible has ended by stopping a display of a camera control operation section displayed on a display screen to indicate that the permitted control time has elapsed.

27. A control method for a camera server that includes a camera whose angle can be freely controlled and transmits images photographed with the camera in accordance with instructions from clients in remote locations to the clients, the control method comprising:

a step of notifying, when the camera server has received a control authorization acquisition request for camera control that has been issued by one client, the one client of time information including a waiting time before the camera control is possible and a permitted control time during which the camera control is permitted for a fixed period after the waiting time has elapsed.

28. A control method for a camera server according to claim 27, wherein when the camera server has received a control authorization acquisition request from another client following the one client, a waiting time of the other client is calculated based on a remaining waiting time and the permitted control time of the one client or on a remaining part of the permitted control time if the one client has commenced camera control after the waiting time has elapsed, and the other client is notified of the calculated waiting time and the permitted control time.

29. A control method for a camera server according to claim 27, further comprising a step of receiving identification information that identifies a client that has issued the control authorization acquisition request, storing the identification information in a storage means provided in the camera server, and searching a management table for managing identification information and the waiting times and permitted control times of clients corresponding to the identification information to confirm whether the received identification information is included in the management table; and a step of associating, when the received identification information is not included in the management table, the received identification information with the notified waiting time and the permitted control time and registering the identification information, the waiting time, and the permitted control time in the management table.

30. A control method for a camera server according to claim 29, wherein when the received identification information is included in the management table, a control authorization acquisition request from a client corresponding to the received identification information is not accepted and the client is notified of the waiting time and the permitted control time of the client that are present in the management table.

31. A control method for a camera server according to claim 29, wherein the identification information and the time information corresponding to a client whose permitted control time in the management table has reached zero are deleted from the management table.

32. A control method for a camera server according to claim 27, wherein when the client permitted to control the camera is switched, operations of the camera are stopped for a predetermined time.

33. A control method for a camera server according to claim 27, wherein when the client permitted to control the camera is switched, a camera control request is not accepted from the client permitted to control the camera for a predetermined time.

34. A control method for a client that is connected to a camera server that transmits images photographed by a camera whose angle can be freely controlled, the control method comprising:

a step of issuing the control authorization acquisition request for camera control and identification information for the client to the camera server;

a step of receiving a waiting time before the camera control is possible and a permitted control time during which the camera control is permitted for a fixed period after the waiting time has elapsed that are sent in reply from the camera server that has received the control authorization acquisition request and the identification information; and a step of informing, after the waiting time has elapsed from a point at which the waiting time was received, a user that the camera control is permitted for a fixed period after the waiting time has elapsed.

35. A computer-readable recording medium on which is recorded a program for causing an apparatus to function as a camera server, which includes a camera whose angle can be freely controlled and transmits images photographed with the camera in accordance with instructions from clients in remote locations to the clients, the program causing the apparatus to function as a notifying means operable, when the camera server has received a control authorization acquisition request for camera control that has been issued by one client, to notify the one client of time information including a waiting time before the camera control is possible and a permitted control time during which the camera control is permitted for a fixed period after the waiting time has elapsed.

36. A computer-readable recording medium on which is recorded a program for causing an apparatus to function as a client that is connected to a camera server that transmits images photographed by a camera whose angle can be freely controlled, the program causing the apparatus to function as:

an issuing means for issuing the control authorization acquisition request for camera control and identification information for the client to the camera server;

receiving means for receiving a waiting time before the camera control is possible and a permitted control time during which the camera control is permitted for a fixed period after the waiting time has elapsed that are sent in reply from the camera server that has received the control authorization acquisition request and the identification information; and informing means operable after the waiting time has elapsed from a point at which the waiting time was received to inform a user that the camera control is permitted for a fixed period after the waiting time has elapsed.

37. A camera control system comprising:

a camera server for controlling a pan/tilt camera; and a client that remotely indicates a pan/tilt of the pan/tilt camera, wherein the client sends a control authorization acquisition request for camera control, and when the control authorization acquisition request is received from the client, the camera server transmits time information including a waiting time and a permitted control time to the client for a fixed period after the waiting time has elapsed.

38. A camera control system according to claim 37, wherein the waiting time transmitted to the client is calculated based on a remaining waiting time and the permitted control time of a previous client that previously issued a control acquisition request to the camera server or on a remaining part of the permitted control time if the previous client has commenced camera control after the waiting time has elapsed.

39. A camera control system according to claim 37, wherein the client transmits identification information that identifies the client together with the control authorization acquisition request and the camera server additionally receives the identification information and registers the identification information and the waiting time and permitted control time of the client corresponding to the identification information in a management table.

40. A camera control system according to claim 39, wherein on receiving the control authorization acquisition request from the client, the camera server deletes the control authorization acquisition request if the client is already registered in the management table.

* * * * *